(12) United States Patent
Azuma et al.

(10) Patent No.: US 8,448,984 B2
(45) Date of Patent: May 28, 2013

(54) AIRBAG DEVICE

(75) Inventors: Hidetaka Azuma, Kyoto (JP); Shuhei Konishi, Settsu (JP)

(73) Assignee: Ashimore Industry Co., Ltd., Osaka (JP)

( * ) Notice: Subject to any disclaimer, the term of this patent is extended or adjusted under 35 U.S.C. 154(b) by 186 days.

(21) Appl. No.: 12/921,068

(22) PCT Filed: Feb. 18, 2009

(86) PCT No.: PCT/JP2009/052807
§ 371 (c)(1),
(2), (4) Date: Nov. 9, 2010

(87) PCT Pub. No.: WO2009/110318
PCT Pub. Date: Sep. 11, 2009

(65) Prior Publication Data
US 2011/0042927 A1    Feb. 24, 2011

(30) Foreign Application Priority Data

Mar. 7, 2008  (JP) ................................. 2008-058521
Mar. 7, 2008  (JP) ................................. 2008-058522

(51) Int. Cl.
*B60R 21/262* (2011.01)

(52) U.S. Cl.
USPC .................... 280/742; 280/730.2; 280/736

(58) Field of Classification Search
CPC ........ B60R 21/26; B60R 21/261; B60R 21/262
USPC ...................... 280/730.2, 736, 742
See application file for complete search history.

(56) References Cited

U.S. PATENT DOCUMENTS 5,464,246 A * 11/1995 Castro et al. ............... 280/730.2
6,260,878 B1 * 7/2001 Tanase ....................... 280/730.2

(Continued)

FOREIGN PATENT DOCUMENTS

| JP | 2001-233156 A | 8/2001 |
| JP | 2002-019562 A | 1/2002 |

(Continued)

OTHER PUBLICATIONS

Japanese Office Action corresponding to Japanese Patent Application No. 2008-058522, dated Oct. 30, 2012.

(Continued)

*Primary Examiner* — Paul N Dickson
*Assistant Examiner* — Timothy Wilhelm
(74) *Attorney, Agent, or Firm* — Sughrue Mion, PLLC (57) ABSTRACT

Gas supplied from gas discharge ports is guided without providing a metal guide tube on the inflator of an airbag device, and the airbag is protected from the gas. An inner tube (50) is connected to a gas inlet (13) formed in an airbag (10), and an inflator (40) around which a fabric member (60) is wound is inserted into and attached to a gas passage (54) formed in the inner tube (50). The fabric member (60) is wound around the inflator (40) several times into a tubular shape such that it covers a plurality of gas discharge ports (42) provided in the inflator (40) and such that one end thereof opens to the inside of the airbag (10), and the fabric member (60) is inserted into the inner tube (50). When the inflator (40) is activated, gas from the gas discharge ports (42) is guided to the inside of the inner tube (50) by the fabric member (60) and is guided and supplied to air chambers (31) and (32) through the gas passage (54), thereby inflating and deploying the airbag (10).

24 Claims, 5 Drawing Sheets

U.S. PATENT DOCUMENTS

| | | | | |
|---|---|---|---|---|
| 6,273,456 | B1 * | 8/2001 | Heigl | 280/730.2 |
| 6,450,529 | B1 * | 9/2002 | Kalandek et al. | 280/730.2 |
| 6,530,595 | B2 * | 3/2003 | Masuda et al. | 280/730.2 |
| 6,863,089 | B2 * | 3/2005 | Kitamura et al. | 138/126 |
| 7,404,572 | B2 * | 7/2008 | Salmo et al. | 280/729 |
| 7,648,162 | B2 * | 1/2010 | Brough et al. | 280/730.2 |
| 7,988,191 | B2 * | 8/2011 | Weyrich | 280/736 |
| 8,091,917 | B2 * | 1/2012 | Weyrich et al. | 280/728.2 |
| 2002/0070537 | A1 * | 6/2002 | Webber et al. | 280/730.2 |
| 2005/0006888 | A1 | 1/2005 | Yamanaka | |
| 2008/0111357 | A1 * | 5/2008 | Heninger et al. | 280/740 |
| 2008/0224457 | A1 * | 9/2008 | Brough et al. | 280/730.2 |

FOREIGN PATENT DOCUMENTS

| | | |
|---|---|---|
| JP | 2003291772 A | 10/2003 |
| JP | 2005-511406 A | 4/2005 |
| JP | 2007-045173 A | 2/2007 |
| JP | 2007-331421 A | 12/2007 |
| WO | 2006/048223 A1 | 5/2006 |
| WO | 2006/092226 A2 | 9/2006 |

OTHER PUBLICATIONS

Japanese Office Action corresponding to Japanese Patent Application No. 2008-058521, dated Oct. 30, 2012.

* cited by examiner

AIRBAG DEVICE

CROSS REFERENCE TO RELATED APPLICATIONS

This application is a National Stage of International Application No. PCT/JP2009/052807 filed Feb. 18, 2009, claiming priority based on Japanese Patent Application No. 2008-058521 filed Mar. 7, 2008 and Japanese Patent Application No. 2008-058522 filed Mar. 7, 2008, the contents of all of which are incorporated herein by reference in their entirety.

TECHNICAL FIELD

The present invention relates to airbag devices installed in vehicles, such as cars, to protect occupants by inflating and deploying an airbag with gas supplied from an inflator.

BACKGROUND ART

In order to protect an occupant in the driver's seat or the passenger seat in a collision or an emergency of a vehicle, cars with an airbag device, which has an inflatable and deployable airbag, installed in, for example, the steering wheel or the instrument panel are widely used. Furthermore, in recent years, in order to further enhance the function of protecting an occupant, including an occupant who is seated in the rear seat, side-surface side airbag devices that deploy an airbag (a so-called curtain-like airbag) in a curtain-like manner along a side window inside the vehicle so as to cover the entirety thereof are also known (see Patent Document 1).

In the airbag device disclosed in Patent Document 1, the airbag is attached to a roof rail portion or the like on the side of the vehicle such that the airbag is inflated and deployed with gas from an inflator so as to blocks an opening in the vehicle and cover the vehicle wall, thereby protecting mainly the head of the occupant in the front seat or the rear seat. Furthermore, this airbag device uses a cylinder-type inflator, in which a metal guide tube (guide tube portion) is fixed to the outer circumference of its cylindrical main body so as to enclose a plurality of gas discharge ports at one end, an opening in the guide tube at the tip is inserted into the airbag, and the inflator is attached to a gas inlet of the airbag. The airbag device guides gas discharged radially, for example, from the gas discharge ports to an inner tube in the airbag by the guide tube and supplies the gas into the airbag through them, thereby inflating and deploying the airbag.

Herein, typically, the gas inlet of an airbag is formed by sewing edges of a base fabric constituting the airbag into a tubular shape, into which one end of the inflator is inserted together with a guide tube and is fixed from the outside by fixing means, whereby the inflator is attached to the gas inlet. Accordingly, in such a conventional airbag device, the guide tube also serves to protect the airbag by reducing the pressure of the gas discharged from the gas discharge ports of the inflator or by preventing the gas from being directly jetted against the base fabric. Therefore, in order to ensure these functions, typically, a metal member is used as the guide tube, as described above.

However, such a metal guide tube requires high manufacturing cost. In addition, because it needs to be fixed to the outer circumference of the inflator by caulking, the time and effort required to attach the metal guide tube to the inflator tend to be high. This results in problems in that the manufacturing cost of airbag devices increases and that the structure around the inflator becomes complex. Accordingly, it is required that gas is supplied into the airbag from the gas discharge ports while the airbag is assuredly protected from the radially discharged gas, without providing a metal guide tube enclosing the plurality of gas discharge ports of the inflator, unlike in the case of the conventional airbag device.

Furthermore, for example, if a fire breaks out during transportation, storage, or the like of an airbag device, the metal guide tube does not burn and remains fixed to the inflator. If the inflator is activated in this state, the gas discharged radially from the gas discharge ports is discharged from the opening at one end of the guide tube in the direction of the opening. By this, a driving force acts on the inflator, causing the inflator to be thrown into the air, which increases the risk.

[Patent Document 1]
the Publication of Japanese Patent No. 3689845

DISCLOSURE OF INVENTION

Problems to be Solved by the Invention

The present invention has been made in view of the above-described conventional problems, and an object thereof is to enable gas discharged radially from a plurality of gas discharge ports to be guided without providing a metal guide tube on an inflator of an airbag device and to enable the airbag to be assuredly protected from the gas. Furthermore, another object is to simplify the structure of the airbag device to reduce the manufacturing cost and the risk.

Means for Solving the Problems

The present invention is an airbag device including an airbag that can be inflated and deployed so as to cover a wall of a vehicle by introducing gas, and an inflator that discharges gas radially from a plurality of gas discharge ports to supply the gas into the airbag. The airbag has a gas inlet to which the inflator is attached and an air chamber inflated by the gas from the gas inlet. The airbag device has a fabric member that is wound around the inflator several times such that it encloses the plurality of gas discharge ports and opens to the inside of the airbag. The fabric member and the plurality of gas discharge ports of the inflator are inserted into the gas inlet.

Furthermore, the present invention is an airbag device including an airbag that can be inflated and deployed so as to cover a wall of a vehicle by introducing gas, and an inflator that discharges gas radially from a plurality of gas discharge ports to supply the gas into the airbag. The airbag has a gas inlet to which the inflator is attached and an air chamber inflated by the gas from the gas inlet. The airbag device has a fabric member that is wound around the inflator several times such that it encloses the plurality of gas discharge ports and opens to the inside of the airbag, a thread grain thereof being disposed at an angle with respect to the winding direction, the fabric member and the plurality of gas discharge ports of the inflator being inserted into the gas inlet.

Moreover, the present invention is an airbag device including an airbag that can be inflated and deployed so as to cover a wall of a vehicle by introducing gas, and an inflator that discharges gas radially from a plurality of gas discharge ports to supply the gas into the airbag. The airbag has a gas inlet to which the inflator is attached and an air chamber inflated by the gas from the gas inlet. The airbag device has a braided tube that has a spiral thread grain and is disposed on the inflator such that it encloses the plurality of gas discharge ports and opens to the inside of the airbag, the braided tube and the plurality of gas discharge ports of the inflator being inserted into the gas inlet.

ADVANTAGES

According to the present invention, it is possible to guide gas discharged radially from a plurality of gas discharge ports without providing a metal guide tube on the inflator of an airbag device and to assuredly protect the airbag from the gas. Furthermore, it is possible to simplify the structure of the airbag device to reduce the manufacturing cost and the risk.

REFERENCE NUMERALS 1, 1': airbag device, 10: airbag, 11: upper attaching tab, 12: front attaching tab, 13: gas inlet, 20: front-side base fabric, 21: rear-side base fabric, 22: outer peripheral connecting portion, 23, 24, 25, 26: inner connecting portion, 30: air chamber, 31: front air chamber, 31A, 31B, 31C, 31D: small air chamber, 32: rear air chamber, 32A, 32B: small air chamber, 33: connecting portion, 40: inflator, 41: small-diameter portion, 42: gas discharge port, 45: clamp, 50: inner tube, 51: gas flow-out port, 52: opening, 53: sewn portion, 54: gas passage, 55: sewn portion, and 60, 60A: fabric member.

BEST MODES FOR CARRYING OUT THE INVENTION

An airbag device according to an embodiment of the present invention will be described below with reference to the drawings.

This airbag device is a side-surface airbag device (side airbag device) in which an airbag is deployed in a predetermined area on the inner side of a vehicle, for example, from the driver's seat or the passenger seat of the car to the rear seat in the rear of the vehicle, and protects an occupant in the vehicle during collision or rolling over of the vehicle. Furthermore, the following embodiments will be descried taking a head protecting airbag device as an example, which inflates and deploys an airbag in a curtain-like manner from a roof rail portion or the like at the upper portion of the side of a vehicle to protect mainly the head of an occupant in the front or rear seat.

First Embodiment

Figure 1:
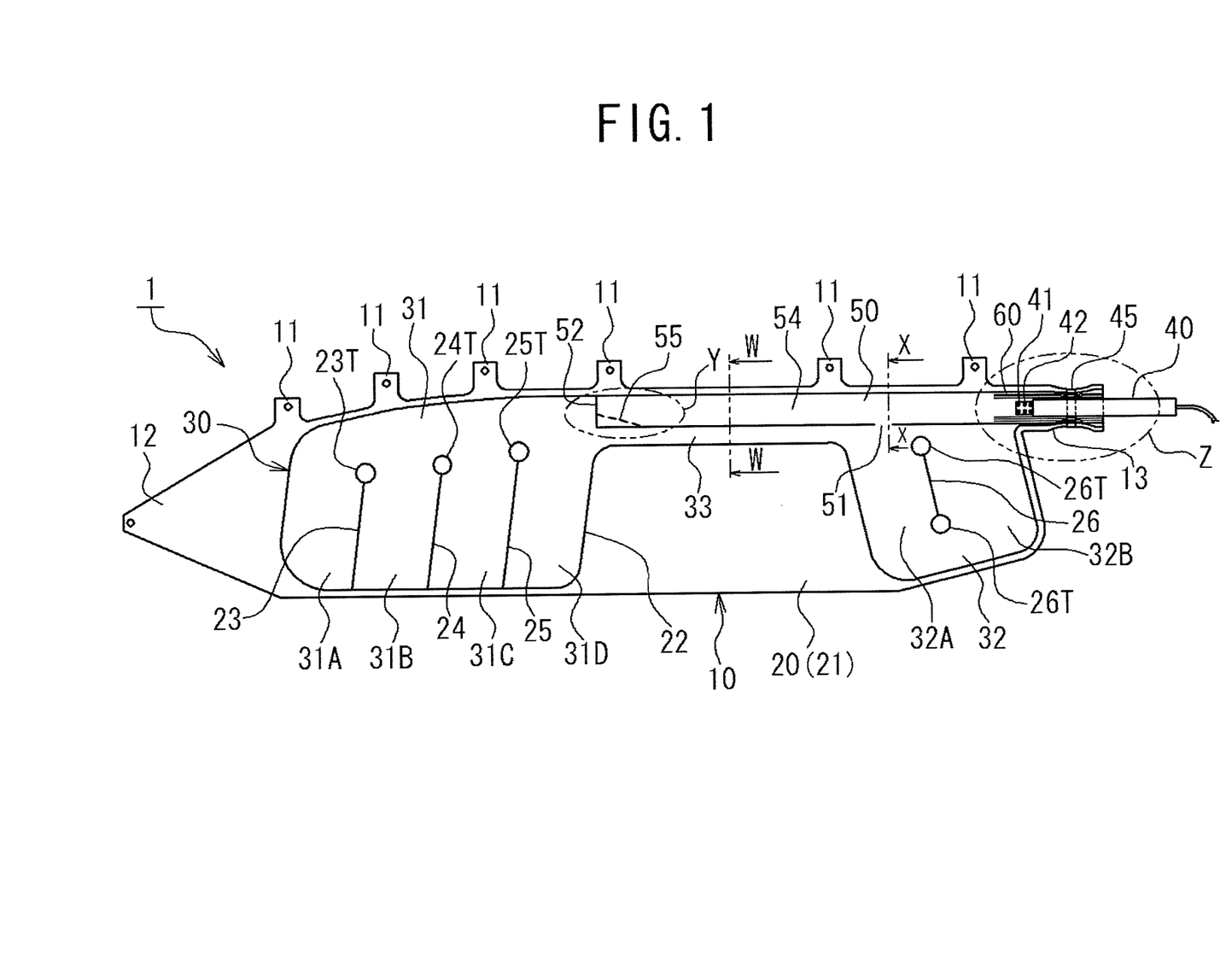
FIG. 1 is a front view schematically showing the relevant part of an airbag device according to a first embodiment.

FIG. 1 is a front view schematically showing the relevant part of an airbag device according to a first embodiment and is a developed plan view schematically showing the shape of the airbag in a deployed state. Furthermore, FIG. 1 shows the internal configuration by seeing through the interior of the airbag.

In FIG. 1, an inflator 40 (described below) side (in the figure, the right side of an oblong airbag 10) is the rear side (rear pillar side) of a vehicle, and the opposite side (in the figure, the left side of the airbag 10) is the front side (front pillar side) of the vehicle. Furthermore, in the airbag device 1 according to this embodiment, the airbag 10 is disposed and stored in a roof rail portion or the like (not shown) at the upper portion of the side of the vehicle (in the figure, the upper side of the airbag 10), and is deployed downward or the like in a curtain-like manner from the stored state. Thus, the airbag 10 is inflated and deployed along a side window inside the vehicle (in the figure, located on the far side of the paper plane) (not shown) so as to cover the entirety thereof, blocks an opening in the vehicle, and is inflated and deployed between an occupant and the vehicle wall or the like.

More specifically, as shown in the figure, this airbag device 1 includes the airbag 10 that can be inflated and deployed by gas introduced (flowing) therein so as to cover the vehicle wall and the inflator 40 connected to one end thereof (herein, the rear side of the vehicle) to supply the gas into the airbag 10. Furthermore, the airbag device 1 includes other conventional configurations, such as an airbag cover provided inside the vehicle to store the airbag 10 and the inflator 40 in a predetermined state while they are not operated, and fixing means for fixing the airbag 10 and the inflator 40 to the vehicle (the airbag cover and the fixing means are not shown).

The airbag 10 has a substantially oblong bag-like shape corresponding to the shape of the side window of the vehicle to be covered and has a plurality of (in the figure, six) substantially rectangular upper attaching tabs 11 at the upper edge, with which the airbag 10 is attached to the roof rail portion of the vehicle. Furthermore, the airbag 10 has a substantially triangular front attaching tab 12 protruding to the front of the vehicle, whose tip portion (protruding end) is attached to the front pillar portion of the vehicle.

The airbag 10 is attached to the vehicle by fixing these attaching tabs 11 and 12 to predetermined positions of the vehicle with fixing means, e.g., bolts. The airbags 10, before being inflated, are stored and disposed in airbag covers or the like provided at several positions of the vehicle. At this time, the airbag 10 is stored such that it can be inflated and deployed in the downward direction or the like, by being sequentially folded toward the attaching tabs 11 and 12 (toward the upper edge) or by being rolled up from the lower edge to the upper edge toward the vehicle's interior side. On the other hand, when the inflator 40 is activated, the airbag 10 in the stored state is inflated, pushes and opens the airbag cover, and is inflated and deployed in a curtain-like manner mainly in the downward direction of the vehicle.

This airbag 10 is formed in a substantially bag-like shape by, for example, layering two base fabrics having the same shape formed by cutting woven fabric, or folding a single base fabric having a symmetric shape and then connecting the opposed base fabrics in an airtight manner at a predetermined position by sewing or bonding them together along the edge so as to form an inflatable air chamber (cell) 30 therebetween.

In this embodiment, the airbag 10 is made of a front-side base fabric 20 on the occupant side and a rear-side base fabric 21 on the window side, which are symmetrical to each other (herein, an oblong shape), and the opposed base fabrics 20 and 21 are sewn together along an outer peripheral connecting portion 22. This outer peripheral connecting portion 22 is a connecting portion that divides the inside and outside of the airbag 10 to define the outer peripheral shape of the air chamber 30 and is formed by sewing the base fabrics 20 and 21 together once or several times along the position corresponding to the outer periphery of the air chamber 30 to be formed.

Thus, the air chamber 30 is formed into a bag-like shape extending continuously in the front-rear direction of the vehicle and including a front air chamber 31 having a substantially rectangular shape in plan view for mainly protecting an occupant in the front seat, a rear air chamber 32 smaller than the front air chamber 31 and having a substantially rectangular shape in plan view for mainly protecting an occupant in the rear seat, and a connecting portion 33 connecting the upper portions of the air chambers 31 and 32. Note that the connecting portion 33 is formed to be narrower, i.e., to have a smaller top-bottom dimension, than the air chambers 31 and 32 and is disposed linearly between the air chambers 31 and 32 so as to extend along the upper edge of the airbag 10.

Furthermore, in the airbag 10, the opposed base fabrics 20 and 21 are connected to each other by sewing at inner connecting portions 23 to 26 provided in the air chambers 31 and 32. These inner connecting portions 23 to 26 serve as control means restricting inflation of the air chambers 31 and 32 in the thickness direction (in the figure, in the direction perpendicular to the paper plane) and controlling the thickness and shape thereof, or serve as partitions or the like dividing the inside of the air chambers 31 and 32 to form a gas flow path portion and an inflation portion. These inner connecting portions 23 to 26 are formed in predetermined shapes according to the purposes, and one or a plurality of such inner connecting portions are disposed at a predetermined position in the air chamber 30.

Herein, in the front air chamber 31, three inner connecting portions 23, 24, and 25 are formed such that they extend obliquely upward from the lower outer peripheral connecting portion 22 to predetermined positions at a distance from the upper outer peripheral connecting portion 22, in the front air chamber 31. Furthermore, these inner connecting portions 23, 24, and 25 are disposed at predetermined intervals (herein, substantially equal intervals) in the front-rear direction of the vehicle to divide the inside of the front air chamber 31 in the front-rear direction of the vehicle. Thus, four substantially rectangular small air chambers (cells) 31A, 31B, 31C, and 31D arranged in the front-rear direction of the vehicle are formed in the front air chamber 31 such that they are closed at one end (at the lower end) and open at the other end (at the upper end) and communicate with one another through the upper portion of the front air chamber 31. At the same time, in this airbag 10, the base fabrics 20 and 21 are sewn together so as to form circles at the ends (terminal ends) 23T, 24T, and 25T of the inner connecting portions 23, 24, and 25, which increases the strength around the ends and prevents damage.

On the other hand, in the rear air chamber 32, one inner connecting portion 26 is formed so as to extend obliquely in the top-bottom direction, whose ends 26T are terminated inside the rear air chamber 32 and are sewn in a circular shape. As a result, the rear air chamber 32 is divided into two small air chambers 32A and 32B arranged in the front-rear direction of the vehicle, which communicate with each other at the upper and lower portions.

In addition, in this airbag device 1, the base fabrics 20 and 21 protrude outward at the upper portion at one end (herein, on the rear side of the vehicle) of the airbag 10 to provide a portion where the base fabrics 20 and 21 are not connected to each other between the ends of the outer peripheral connecting portion 22 connecting these base fabrics, forming a gas inlet 13 having a substantially tubular shape. That is, the gas inlet 13 is an opening where a part of the rear air chamber 32 is open to the outside of the airbag 10 and where the inside and outside of the air chamber 30 communicate with each other. The gas inlet 13 serves as a gas flow-in port (supply port) through which gas from the inflator 40 is introduced into the airbag 10 and is supplied and flowed into the air chamber 30.

Herein, the inflator 40 is a cylinder-type gas generator having a substantially cylindrical shape and has a small-diameter portion 41 concentrically protruding at one end in the longitudinal direction (in the figure, the tip portion in the airbag 10) and having a plurality of gas discharge ports 42 in the circumferential direction. In this airbag device 1, one end of the inflator 40 on the small-diameter portion 41 side is inserted into the gas inlet 13 of the airbag 10 such that the gas discharge ports 42 are positioned near the rear air chamber 32, and the airbag 10 is fitted to the outer circumference of the inflator 40 and is fixed thereto with a ring-like clamp (band) 45.

Thus, the inflator 40 is attached to the gas inlet 13, allowing gas discharged radially from the plurality of gas discharge ports 42 of the inflator 40 to be introduced from the gas inlet 13, supplied into the airbag 10, and flowed into the air chamber 30, thereby inflating the air chambers 31 and 32. At this time, herein, the gas generated by the inflator 40 is guided by an inner tube 50 disposed in the airbag 10 and a fabric member (base fabric) 60 wound around the inflator 40 and is supplied to a predetermined position in the airbag 10.

The inner tube 50 is a guide member that guides the gas from the gas inlet 13 (inflator 40) to the rear air chamber 32 and the front air chamber 31 of the air chamber 30. The inner tube 50 is connected to the gas inlet 13 and is disposed in the airbag 10 such that it extends therefrom to the front air chamber 31 through the upper portion of the rear air chamber 32 and the connecting portion 33. Furthermore, in this airbag device 1, the inner tube 50 is formed in a substantially tubular shape and is disposed such that one end thereof extends in the gas inlet 13 and is fixed in a clamped manner to the outer circumference of the inflator 40 with the clamp 45, together with the airbag 10. In addition, one or a plurality of (herein, one) gas flow-out port 51 is provided in the inner tube 50 in the rear air chamber 32 to supply gas into the rear air chamber 32, and an opening 52 is provided at the other end (tip portion) of the inner tube 50 to supply gas into the front air chamber 31.

Figure 2A:
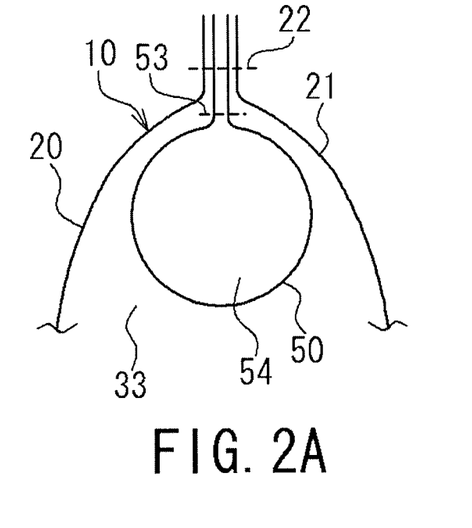
FIG. 2 includes cross-sectional views schematically showing a part of an inner tube in a longitudinal direction according to the first embodiment.
Figure 2B:
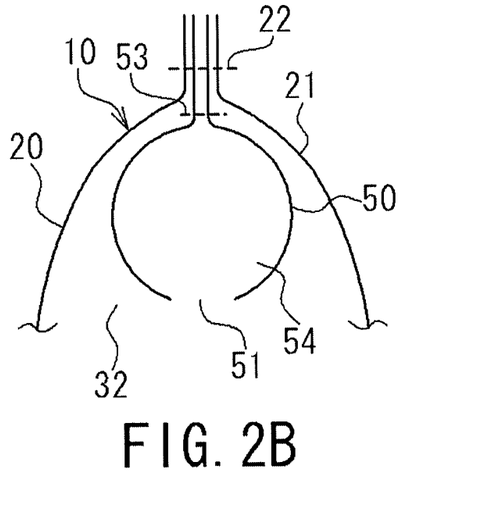

FIG. 2 includes cross-sectional views schematically showing a part of this inner tube 50 in a longitudinal direction. FIG. 2A is a cross-sectional view taken along line W-W in FIG. 1, and FIG. 2B is a cross-sectional view taken along line X-X in FIG. 1, including the gas flow-out port 51.

Figure 3:
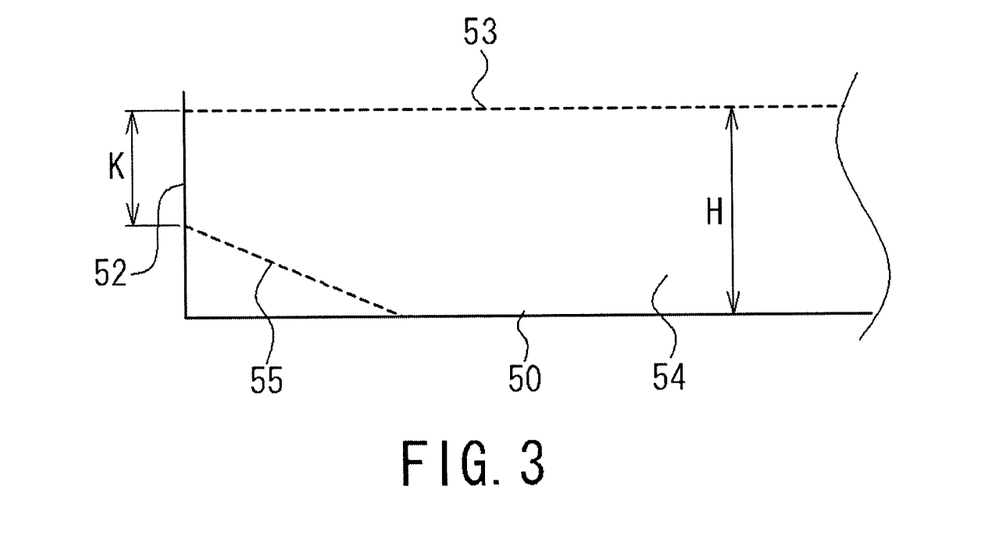
FIG. 3 is a partial enlarged view of a Y region in FIG. 1.

Furthermore, FIG. 3 is a partial enlarged view of a Y region in FIG. 1, showing the tip portion of the inner tube 50 on the opening 52 side.

In this embodiment, the inner tube 50 (see FIG. 2A) is formed in a tubular shape (in the figure, cylindrical) by folding a substantially belt-like base fabric into two in the longitudinal direction and sewing them along the edges to connect them (a sewn portion 53) such that a gas passage 54 extending continuously between the opposed base fabrics is formed. Also, the edges of the inner tube 50 outside the sewn portion 53 (in the figure, on the upper side) are sandwiched between the base fabrics 20 and 21 of the airbag 10 and are sewn at the same time when the outer peripheral connecting portion 22 is sewn, thereby fixing the inner tube 50 to the upper edge of the airbag 10. Furthermore, a through-hole, serving as the gas flow-out port 51, is provided in the inner tube 50 (see FIG. 2B) to establish communication between the inside thereof and the rear air chamber 32, allowing the gas inside the gas passage 54 to flow out through the gas flow-out port 51 and be supplied into the rear air chamber 32.

On the other hand, the tip portion of the inner tube 50 (see FIG. 3) has a sewn portion 55 formed by obliquely sewing a portion opposite the sewn portion 53 (in the figure, the lower side) such that the internal gas passage 54 is gradually narrowed toward the opening 52. Because of this sewn portion 55, the inner tube 50 is formed such that the width K of the opening 52 is smaller than the width H of the gas passage 54 at a position having no sewn portion 55 (H>K). The inner tube 50 guides the gas from the inflator 40 to the front air chamber 31 through the gas passage 54 and supplies the gas through the opening 52, allowing the gas to flow into the small air chambers 31A, 31B, 31C, and 31D to inflate them. On the other hand, at the other end of the inner tube 50 (see FIG. 1), the inflator 40 and the fabric member 60 are inserted into the gas passage 54 and are disposed in a layered manner in a predetermined area.

Figure 4A:
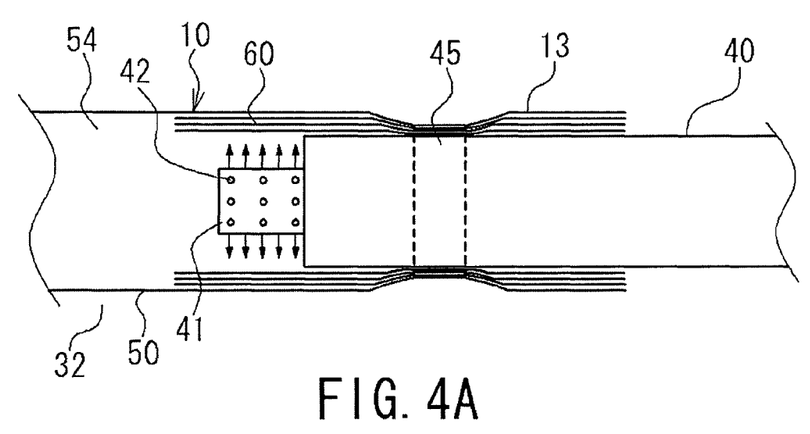
FIG. 4 includes partial enlarged views of a Z region in FIG. 1.
Figure 4B:
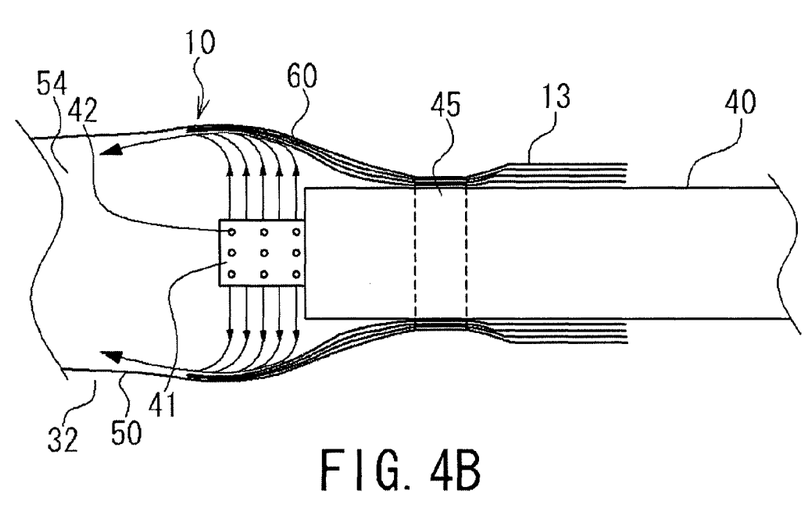

FIG. 4 includes partial enlarged views of a Z region in FIG. 1, including the fabric member 60. FIGS. 4A and 4B show, in sequence, states in which the gas is discharged from the inflator 40.

The fabric member 60 is a fabric winding member formed by, for example, cutting a base fabric into a belt-like piece having a predetermined shape and size, and, as shown in the figure, the fabric member 60 is wound around the outer circumference of the inflator 40 several times (in the figure, three times), in a sequentially layered manner. At this time, the fabric member 60 is disposed such that it protrudes from the small-diameter portion 41 of the inflator 40 toward a position closer to the rear air chamber 32. The fabric member 60 encloses the entirety of the plurality of gas discharge ports 42 located inside (on the inner circumferential side) thereof from the outer circumference, and is wound around the inflator 40 several times such that one end (an opening end) thereof is open to the inside of the airbag 10.

In the airbag device 1, the plurality of gas discharge ports 42 of the inflator 40, together with the fabric member 60 disposed around them, are inserted into the gas inlet 13 of the airbag 10 and are disposed in the inner tube 50, and they are fixed to the outer circumference of the inflator 40 in a clamped manner with the clamp 45. Thus, the fabric member 60 wound in several layers and having a tubular shape is disposed between the gas discharge ports 42 of the inflator 40 and the inner tube 50 and the airbag 10 (the gas inlet 13).

In the airbag device 1, the fabric member 60 receives gas discharged radially from the plurality of gas discharge ports 42 toward the radially outside of the small-diameter portion 41 (see arrows in FIG. 4A) and guides the gas to the opening end of the fabric member 60 inflated by the pressure of the gas (see arrows in FIG. 4B). By this, the gas generated by the inflator 40 is rectified and guided to the inside of the airbag 10 (inner tube 50) located axially outside thereof, and the gas is supplied and flowed into the air chamber 30 of the airbag 10 through them. Accordingly, the fabric member 60 serves as a guide member that guides the gas from the inflator 40. Also, the fabric member 60 serves as a protecting member that receives the gas discharged from the gas discharge ports 42 to reduce the pressure or that prevents the gas from being directly jetted against the airbag 10 and the inner tube 50 to reduce damage and protect them.

Note that the fabric member 60 according to this embodiment is made of a base fabric (cloth) for airbags from which the airbag 10 can be formed, and hence, has a performance the same as or equivalent to the cloth of the airbag 10. Although a non-coat base fabric may be used as the fabric member 60, a base fabric having a coating layer composed of a heat resistant material, such as a heat resistant resin or rubber (for example, silicone resin or rubber), may be used. Herein, a base fabric formed by applying a heat resistant material to one or both surfaces through a surface treatment (a coating-layer forming treatment), such as coating, laminating, or the like, is used as the fabric member 60. Accordingly, the fabric member 60 has a coating layer composed of a heat resistant material at least on one surface. In addition, the fabric member 60 is wound around the outer circumference of the inflator 40 such that the coating layer composed of a heat resistant material is located inside and is disposed such that the aforementioned surface is located on the inner circumferential (gas discharge ports 42) side.

The thus-configured airbag device 1 (see FIG. 1) is installed in a vehicle such that the airbag 10 folded in a predetermined state is attached to and stored in the roof rail portion or the front pillar portion, together with the inflator 40, the fabric member 60, etc. Thereafter, when, for example, the airbag device 1 detects a predetermined impact, it activates the inflator 40 to generate gas, guides the gas discharged from the gas discharge ports 42 through the fabric member 60 and the inner tube 50, and supplies the gas into the airbag 10 (the air chamber 30).

Thus, the gas is allowed to flow into the air chambers 31 and 32 to inflate the air chambers 31 and 32, unfolding the airbag 10 and inflating and deploying the airbag 10 in the downward direction of the vehicle in a curtain-like manner from the attaching tabs 11 and 12 attached to the vehicle. In this manner, the airbag 10 is inflated and deployed between an occupant and a wall of the vehicle or the like at the side surface of the vehicle, receiving the occupant by the inflated air chamber 30 and protecting mainly the head of the occupant.

During this inflation and deployment, in the airbag device 1 according to this embodiment, gas discharged radially from the plurality of gas discharge ports 42 is guided by the fabric member 60 wound around the inflator 40 and is assuredly guided and supplied to the airbag 10.

Therefore, the airbag 10 can be assuredly and appropriately inflated and deployed, and the function to protect an occupant can be increased. At the same time, because the airbag 10 and the inner tube 50 can be protected from the generated gas by the fabric member 60, the airbag device 1 can be assuredly and accurately activated while restricting damage, gas leakage, etc.

Accordingly, in this embodiment, the gas radially discharged and supplied from the plurality of gas discharge ports 42 can be guided without providing a metal guide tube on the inflator 40 of the airbag device 1, unlike in the conventional case, and it is possible to assuredly protect the airbag 10 or the like from the gas. Furthermore, because the metal guide tube is unnecessary, the manufacturing cost can be reduced, and the structure of the airbag device 1 can be relatively simplified mainly around the inflator 40. Moreover, herein, because only the fabric member 60 is wound around the inflator 40, the time and effort required for the attaching operation can also be saved compared with the case where the metal guide tube is fixed. As a result, the manufacturing cost of the airbag device 1 can be saved, and cost reduction can be achieved.

Also, in this airbag device 1, for example, if a fire breaks out during transportation, storage, or the like, the fabric member 60 also burns. Therefore, even if the inflator 40 is activated in this state, the gas from the plurality of gas discharge ports 42 is radially discharged toward the radially outside. Thus, because the gas can be prevented from being discharged from the inflator 40 in one direction, a driving force can be prevented from acting on the inflator 40 in that state. Thus, the inflator 40 can be prevented from bursting out into the air or moving at a high speed along the ground, and the risk can be reduced. Furthermore, even if the fabric member 60 remains unburned, because it opens radially outside due to the gas pressure upon activation of the inflator 40, and the gas escapes in that direction, no driving force acts on the inflator 40 similarly to the above case, and the risk does not increase.

Herein, because the fabric member 60 is merely wound around the inflator 40, when the inflator 40 is activated, it is abruptly inflated by the gas pressure acting thereon, and the position thereof in the circumferential direction is shifted. Thus, the portion subjected to the gas discharged from the gas discharge ports 42 is shifted. Therefore, with this fabric member 60, it is possible to prevent the gas from being jetted against one portion, whereby damage to the fabric member 60 can be restricted and the function thereof can be maintained for a longer term. Furthermore, in this embodiment, because the fabric member 60 is made of a base fabric for airbags, various properties of the fabric member 60 with respect to gas, such as airtightness, are high. Thus, the above-described functions and properties can be sufficiently exhibited, and greater advantages can be obtained.

Moreover, because the fabric member 60 has a coating layer composed of a heat resistant material, the resistance against a relatively high-temperature gas generated from the inflator 40 can be increased. Thus, damage to the fabric member 60 due to the gas can be more effectively prevented. In addition, because this fabric member 60 is wound around the inflator 40 such that the coating layer is located on the inner side (on the side of the gas discharge ports 42), damage due to the gas can be more assuredly prevented, and winding of the fabric member 60 around the inflator 40 is easy. Therefore, the time and effort required for winding operation can be reduced, and winding of the fabric member 60 around the inflator 40 can be more assuredly and accurately performed.

Note that the impact of the gas from the inflator 40 may break and damage a winding-beginning portion of the fabric member 60 on the innermost side constituting the inner circumferential surface. In such a case, by increasing the number of windings of the fabric member 60, the impact of the gas can be absorbed and a crack and damage generated can be stopped in the middle of the layered fabric member 60, and the function can be maintained. Thus, the number of windings of the fabric member 60 around the inflator 40 may be appropriately set according to the gas pressure, impact force, etc., such that the function of the fabric member 60 can be maintained. Furthermore, either a single fabric member 60 may be sequentially wound around the inflator 40 or a plurality of fabric members 60 layered in advance may be wound around the inflator 40.

Moreover, in this airbag device 1, because the inner tube 50 is disposed in the airbag 10, the gas from the inflator 40 can be guided to a predetermined position in the air chamber 30, and the air chambers 31 and 32 and the airbag 10 can be assuredly and appropriately inflated and deployed. At this time, in this embodiment, because the inner tube 50 is disposed such that it extends to the inside of the gas inlet 13 of the airbag 10, the gas supply to the gas passage 54 can be smoothly performed, and the gas leakage to the outside can be restricted. Thus, the gas can be assuredly guided and supplied to the air chambers 31 and 32. Note that it is possible to supply the gas from the inflator 40 to the entirety of the air chamber 30 through the fabric member 60 and the connecting portion 33 to inflate and deploy the airbag 10, without the provision of the inner tube 50.

Figure 5:
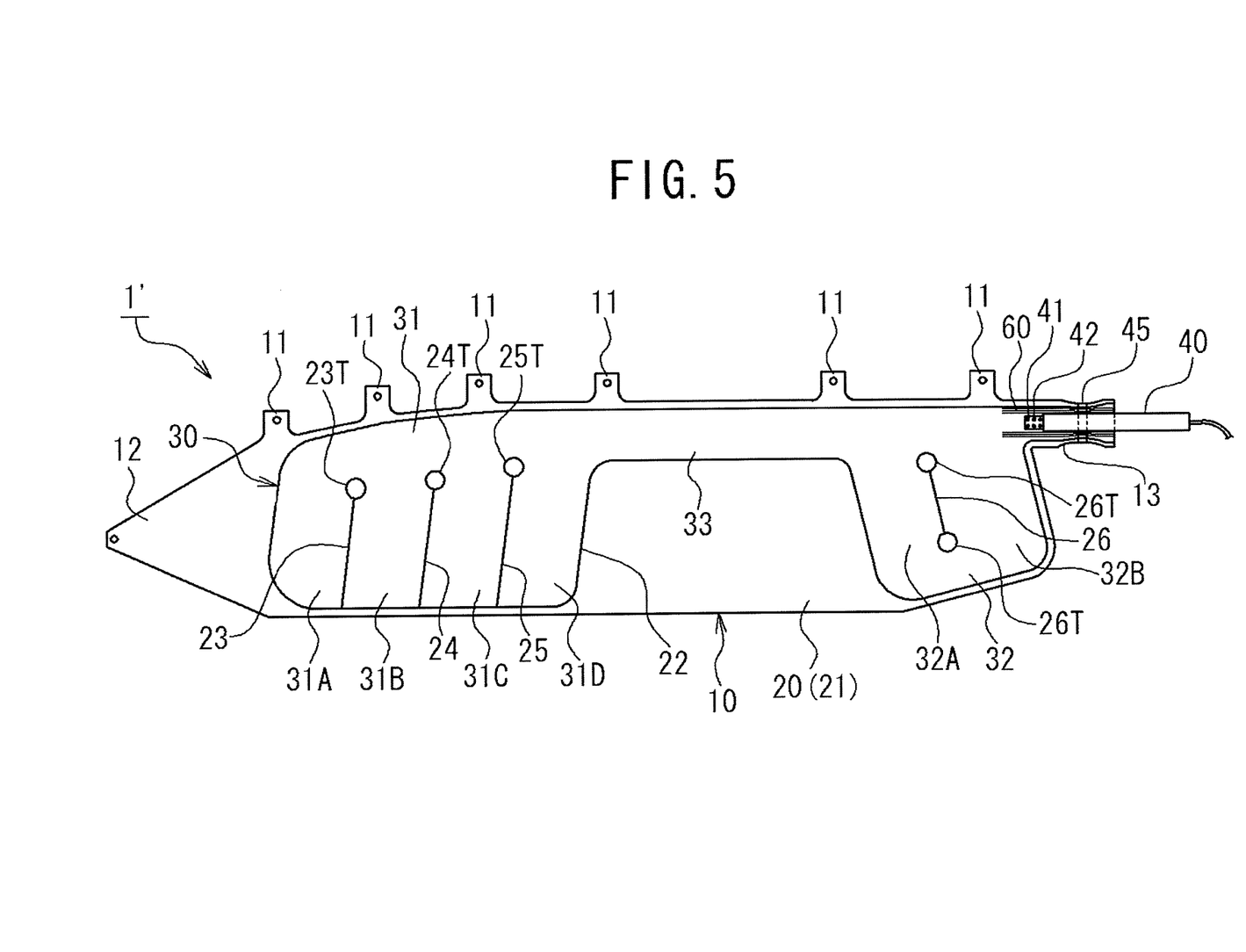
FIG. 5 is a front view schematically showing another example of the airbag device according to the first embodiment.

FIG. 5 is a front view schematically showing the relevant part of an airbag device 1' having no inner tube 50, and is a developed plan view corresponding to FIG. 1, showing the schematic shape of the airbag 10 in a deployed state.

In this airbag device 1', as shown in the figure, the inner tube 50 is not provided in the airbag 10, and the inflator 40 around which the fabric member 60 is wound is directly inserted into the gas inlet 13 and is disposed in the airbag 10.

Accordingly, when the inflator 40 is activated, gas from the gas discharge ports 42 is guided by the fabric member 60 similarly to the above case, flows into the rear air chamber 32, passes through the connecting portion 33, and flows into the front air chamber 31. In this manner, the airbag device 1' supplies the gas to the entirety of the air chamber 30, inflating and deploying the airbag 10 to cover the vehicle wall with the airbag 10, thereby protecting an occupant. Thus, the inner tube 50 does not need to be provided in the airbag 10, depending on the size, the necessary performance, or the like of the airbag 10. In such cases too, an occupant can be sufficiently protected.

Second Embodiment

Next, an airbag device according to a second embodiment of the present invention will be described.

The airbag device 1 according to this embodiment is different from the airbag device 1 described in the first embodiment in the configuration of the fabric member 60, and the other configurations are the same. Accordingly, in the following description, the configurations that are the same as the first embodiment are denoted by the same reference numerals, and descriptions thereof will be omitted. Furthermore, in this second embodiment, all the reference numerals related to a fabric member 60A will be denoted by "A" at the end so as to be distinguished from the fabric member 60 according to the first embodiment.

Herein, as has been described above, there is a concern that the fabric member 60A is torn from the edge or the like of the winding-beginning portion on the innermost side constituting the inner circumferential surface due to the pressure and impact caused by the gas jetted when the inflator 40 is activated, and is torn (cut) and damaged. To counter this, in this embodiment, the direction in which threads constituting the fabric member 60A extend is inclined with respect to the longitudinal direction, which is a direction in which the fabric member 60A is wound around the inflator 40, to achieve improvement. Thus, a thread grain (fabric grain) of the fabric member 60A is disposed at an angle with respect to the winding direction, thereby ensuring the functions of the fabric member 60A as the above-described guide member and the protecting member.

Figure 6A:
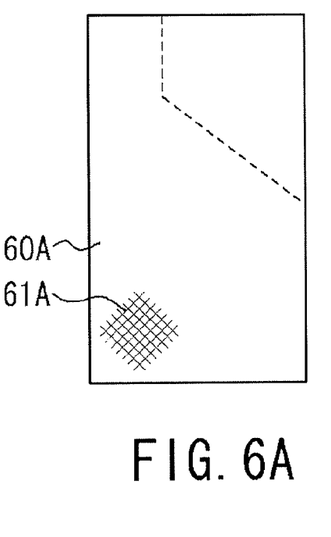
FIG. 6 includes schematic views for describing the configuration and function of a fabric member according to a second embodiment.
Figure 6B:
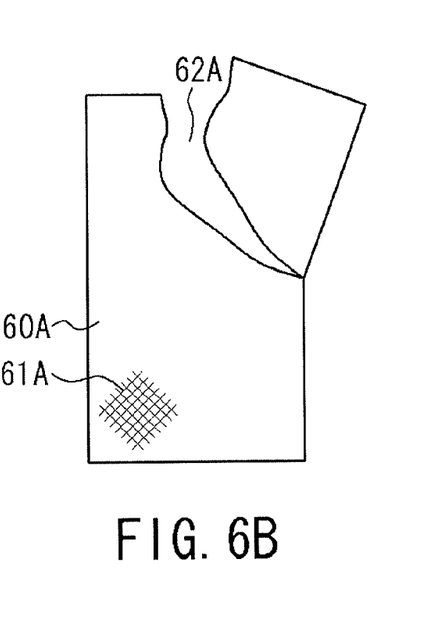

FIG. 6 includes schematic views for describing the configuration and function of the fabric member 60A, showing states before and after the inflator 40 is activated (FIG. 6A shows before, and FIG. 6B shows after), in which the fabric member 60A is shown in a developed plan view.

Figure 7A:
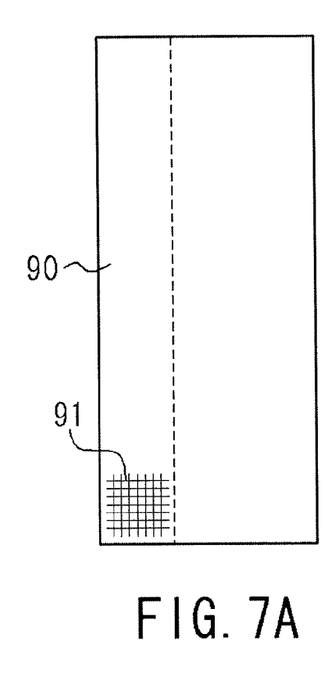
FIG. 7 includes schematic views showing a fabric member according to a comparative example of the second embodiment.
Figure 7B:
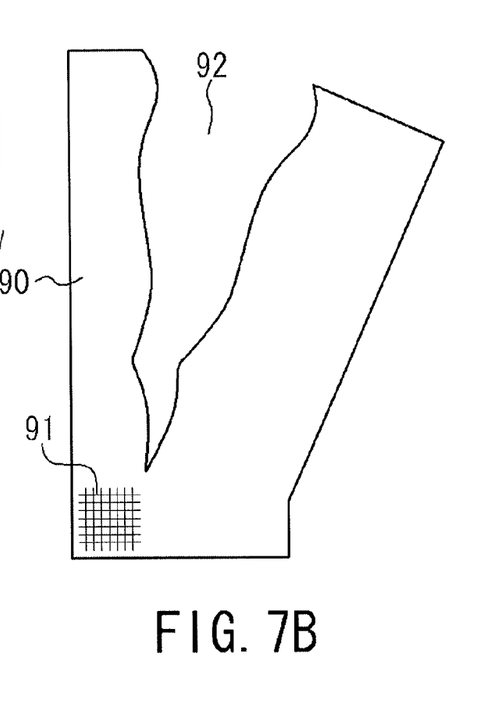

Furthermore, FIG. 7 includes schematic views showing a fabric member 90 in which the thread grain is disposed without any inclination with respect to the winding direction as a comparative example. FIG. 7 shows, similarly to FIG. 6, states before and after the inflator 40 is activated (FIG. 7A shows before, and FIG. 7B shows after), in which the fabric member 90 is shown in a developed plan view.

The fabric member 90 according to the comparative example (see FIG. 7A) is a base fabric formed by, for example, cutting a base fabric in a rectangular shape (belt-like shape) along the fabric grain, and the thread grains (the fabric grains) 91 thereof are arranged substantially parallel to and perpendicular to the winding direction M around the inflator 40. When wound around the inflator 40, the fabric member 90 is wound in a sequentially layered manner from one end to the other end (in the figure, from the upper side to the lower side) in the longitudinal direction, such that the directions of the thread grains 91 are aligned with the circumferential direction and axial direction of the fabric member 90 having a tubular shape. When the inflator 40 is activated in this state, in the fabric member 90, due to the impact caused by the pressure of the gas radially jetted from the discharge ports 42, a crack 92 (see FIG. 7B) tends to be produced at a winding-beginning edge subjected to the gas, propagate along the thread grains 91, and greatly develop in the winding direction M (the circumferential direction). Thus, in this fabric member 90, the large crack 92 is likely to be produced at a portion of the inflator 40 enclosing the gas discharge ports 42 (see FIG. 4), and the large crack 92 may reach the outer circumference, allowing the inside and the outside to communicate with each other and the gas to leak out therefrom. Accordingly, in this fabric member 90, in order to prevent gas leakage due to the crack 92 reaching the outer circumference, the fabric member 90 having a length sufficiently larger than the length of the crack 92 to be produced needs to be wound around the inflator 40.

In contrast, the fabric member 60A of the airbag device 1 (see FIG. 6A) is formed in the same rectangular shape such that the directions of the thread grains (fabric grains) 61A are oblique with respect to the winding direction M by changing the cutting direction of the base fabric. Accordingly, when the fabric member 60A is wound around the inflator 40, the directions of the thread grains 61A are oblique to the winding direction M (the circumferential direction), and the threads are disposed such that they extend spirally in the axial direction while sequentially intersecting with one another. Even in this fabric member 60A, when the inflator 40 is activated in this state, a crack 62A (see FIG. 6B) may be produced at the winding-beginning edge due to the impact caused by the gas pressure or the like.

However, in this fabric member 60A, the crack 62A tends to propagate along the thread grain 61A that is oblique to the winding direction M, and, even if the crack 62A propagates in the winding direction M to some extent, it develops obliquely toward one edge. Thus, even if the crack 62A is produced in the fabric member 60A, it is less likely to propagate in the winding direction M, and, even in the most developed state, it extends up to the edge along the winding direction M (in FIG. 6B, the long side on the right side) and stops at that point. Thus, formation of a large crack is restricted. As a result, in this airbag device 1, a crack reaching the outer circumference is prevented from being formed in the fabric member 60A enclosing the gas discharge ports 42 of the inflator 40 (see FIG. 4), and thus, no gas leakage occurs. Accordingly, in this airbag device 1, the fabric member 60A can be maintained to be wound around the inflator 40 and enclosing the gas discharge ports 42, thereby ensuring the functions of the fabric member 60A as a guide member and a protecting member. Furthermore, because the length of the crack 62A produced is short, this fabric member 60A can sufficiently prevent gas leakage with a smaller length, compared with the fabric member 90 according to the comparative example (see FIG. 7). Thus, the length of the fabric member 60A can be reduced, and the number of windings can be reduced.

Note that, if the angle of the thread grain 61A of the fabric member 60A with respect to the winding direction M is less than 15 degrees or more than 75 degrees, the direction in which the crack 62A propagates is also close to the winding direction M, whereby the crack 62A is likely to develop more easily. The length of the fabric member 60A also needs to be increased in response to this, which may result in that the above-described length reduction effect cannot be sufficiently obtained. Thus, the fabric member 60A is desirably formed such that the angle of the thread grain 61A with respect to the winding direction M is set in the range from 15 degrees to 75 degrees. Furthermore, the fabric member 60A according to this embodiment is made of a base fabric (a bias fabric sheet) that is cut at a predetermined angle (herein, about) 45° with respect to the fabric grain such that the thread grain 61A extends at an angle with respect to the winding direction M. This bias fabric sheet is a fabric sheet that is used as, for example, a hemming tape and has a relatively large elasticity in the winding direction M due to the direction of the thread grain 61A. The fabric member 60A is wound around the outer circumference of the inflator 40 in a stretched state utilizing the elasticity. As a result, a winding operation can be performed relatively easily. Also, similarly to the fabric member 60 according to the first embodiment, the fabric member 60A is made of a base fabric for airbags, and, herein, a base fabric having a coating layer composed of a heat resistant material is used at least one side surface. The fabric member 60A is wound around the outer circumference of the inflator 40 such that this coating layer, made of a heat resistant material, is located inside and is disposed such that this side faces the inner circumferential side (the gas discharge ports 42 side).

After being installed in the vehicle in the same manner as above, the airbag device 1 configured as above activates the inflator 40 when it detects a predetermined impact and inflates and deploys the airbag 10 between an occupant and the vehicle wall at the side surface of the vehicle, thereby receiving and protecting the occupant with the inflated air chamber 30. During this inflation and deployment, the airbag device 1 according to this embodiment guides the gas discharged radially from the plurality of gas discharge ports 42 with the fabric member 60A wound around the inflator 40 and supplies the gas into the airbag 10. At this time, as has been described above, this fabric member 60A prevents formation of a large crack, damage (see FIG. 6), and gas leakage. Thus, respective functions can be more assuredly ensured, and the functions as a guide member and a protecting member can be maintained and sufficiently exhibited while the inflator 40 is activated.

Accordingly, in this embodiment, the same advantages as those described with regard to the fabric member 60 in the first embodiment can be obtained with the fabric member 60A. That is, gas discharged radially from the plurality of gas discharge ports 42 can be guided and supplied into the airbag 10 without providing a metal guide tube on the inflator 40 of the airbag device 1, unlike in the conventional case, and the airbag 10 etc., can be assuredly protected from the gas. Furthermore, as described above, the fabric member 60A can reduce the risk of the inflator 40, and the length thereof can be relatively short, and the necessary costs can be reduced. As a result, the manufacturing cost of the airbag device 1 can be further reduced, achieving further cost reduction. In addition, herein, because the fabric member 60A is made of bias fabric and is wound around the inflator 40 utilizing its elasticity, winding can be easily performed, and the time and effort required for that operation can be reduced. At the same time, winding of the fabric member 60A around the inflator 40 can be more assuredly and accurately performed.

Note that, by increasing the number of windings of the fabric member 60A around the inflator 40, the function of absorbing the impact of the gas is increased, whereby the crack 62A and damage generated are more assuredly stopped in the middle of the layered fabric member 60A, and the function thereof can be further increased. Accordingly, the number of windings of the fabric member 60A around the inflator 40 may be appropriately set according to the gas pressure, impact force, etc., such that the function of the fabric member 60A can be maintained.

Although the description has been given taking as an example the airbag device 1 whose fabric member 60A is made of a base fabric, another member whose thread grain 61A is disposed at an angle with respect to the winding direction M, for example, a braided tube, may be used as the fabric member 60A. A braided tube is a braided member formed by braiding a plurality of threads into a tubular shape and is a tubular member in which the threads are disposed so as to extend spirally and the thread grain extends spirally with respect to the longitudinal direction. By cutting this braided tube having a spiral thread grain linearly in the longitudinal direction or obliquely, the fabric member 60A whose thread grain 61A extends at an angle with respect to the winding direction M is formed. Accordingly, the same advantages as above can be obtained also by winding the thus-formed fabric member 60A around the inflator 40.

Furthermore, it is also possible that this braided tube is formed to have a size corresponding to the outer circumference of the inflator 40 without being cut and the inflator 40 is inserted therein so that the braided tube is used instead of the fabric member 60A. In this case, one or a plurality of layered braided tubes are placed on the inflator 40 such that it encloses the plurality of gas discharge ports 42 and such that it opens to the inside of the airbag 10, similarly to the fabric member 60A. The plurality of gas discharge ports 42 of the inflator 40, together with this braided tube, are inserted into the gas inlet 13 of the airbag 10 to guide and supply the gas from the gas discharge ports 42 into the airbag 10 by the braided tube on the outer circumference side thereof. Note that, similarly to the fabric member 60A, the resistance etc., of these braided tubes can be increased by coating one or both of the inner surface and the outer surface with a heat resistant material. Thus, it is more desirable that a coating layer composed of a heat resistant material be provided at least on one surface.

The invention claimed is:

1. An airbag device comprising:
   an airbag that can be inflated and deployed so as to cover a wall of a vehicle by introducing gas; and
   an inflator, having a main body, that discharges gas radially from a plurality of gas discharge ports disposed at one end of said body to supply the gas into an air chamber inside of the airbag,
   wherein the airbag has a gas inlet to which the inflator is attached and the air chamber is inflated by the gas from the gas inlet,
   wherein the airbag device has a fabric member that is formed of a single belt-like piece and is wound around the inflator several times in sequentially layered manner such that the fabric member encloses the plurality of gas discharge ports and opens to the inside of the airbag and is inflated by the gas pressure acting thereon and shifted in the circumferential direction thereof when the inflator is activated, and
   wherein the fabric member and the plurality of gas discharge ports of the inflator being inserted together into the gas inlet towards the air chamber inside of the airbag.

2. The airbag device according to claim 1, further comprising an inner tube that is disposed in the airbag and is connected to the gas inlet to guide gas from the gas inlet to the air chamber.

3. The airbag device according to claim 2,
   wherein the inner tube is disposed such that it extends to the inside of the gas inlet.

4. The airbag device according to claim 3,
   wherein the fabric member is made of a base fabric for airbags.

5. The airbag device according to claim 3,
   wherein the fabric member has a coating layer composed of a heat resistant material.

6. The airbag device according to claim 5,
   wherein the fabric member is wound around the inflator such that the coating layer is located inside.

7. The airbag device according to claim 2,
   wherein the fabric member is made of a base fabric for airbags.

8. The airbag device according to claim 2,
   wherein the fabric member has a coating layer composed of a heat resistant material.

9. The airbag device according to claim 8,
   wherein the fabric member is wound around the inflator such that the coating layer is located inside.

10. The airbag device according to claim 1,
    wherein the fabric member is made of a base fabric for airbags.

11. The airbag device according to claim 10,
    wherein the fabric member has a coating layer composed of a heat resistant material.

12. The airbag device according to claim 11,
    wherein the fabric member is wound around the inflator such that the coating layer is located inside.

13. The airbag device according to claim 1,
    wherein the fabric member has a coating layer composed of a heat resistant material.

14. The airbag device according to claim 13,
    wherein the fabric member is wound around the inflator such that the coating layer is located inside.

15. The airbag device according to claim 1, wherein said inflator is secured to said gas inlet by a clamp, and
    wherein said plurality of gas discharge ports are disposed in a position with respect to said clamp that is toward the air chamber.

16. The airbag device according to claim 1, wherein said airbag device has no metal guide tube fixed to an outer circumference of said inflator main body.

17. An airbag device comprising:
    an airbag that can be inflated and deployed so as to cover a wall of a vehicle by introducing gas; and
    an inflator, having a main body, that discharges gas radially from a plurality of gas discharge ports disposed at one end of said body to supply the gas into an air chamber inside of the airbag,
    wherein the airbag has a gas inlet to which the inflator is attached and the air chamber is inflated by the gas from the gas inlet,
    wherein the airbag device has a fabric member that is formed of a single belt-like piece and is wound around the inflator several times in a sequentially layered manner such that it encloses the plurality of gas discharge ports and opens to the inside of the airbag and is inflated by the gas pressure acting thereon and shifted in the circumferential direction thereof when the inflator is activated,
    wherein a thread grain of said fabric member is inclined at an angle with respect to a winding direction of the fabric member, and
    wherein the fabric member and the plurality of gas discharge ports of the inflator being inserted together into the gas inlet.

18. The airbag device according to claim 17,
    wherein the angle of the thread grain of the fabric member with respect to the winding direction is in the range of 15 degrees to 75 degrees.

19. The airbag device according to claim 18,
wherein the fabric member has a coating layer composed of a heat resistant material.

20. The airbag device according to claim 17,
wherein the fabric member is formed by cutting a braided tube having a spiral thread grain.

21. The airbag device according to claim 20,
wherein the fabric member has a coating layer composed of a heat resistant material.

22. The airbag device according to claim 17,
wherein the fabric member has a coating layer composed of a heat resistant material.

23. The airbag device according to claim 17, wherein said inflator is secured to said gas inlet by a clamp, and
wherein said plurality of gas discharge ports are disposed in a position with respect to said clamp that is toward the air chamber.

24. The airbag device according to claim 17, wherein said airbag device has no metal guide tube fixed to an outer circumference of said inflator main body.

* * * * *